United States Patent [19]

Raleigh

[11] 4,039,469

[45] Aug. 2, 1977

[54] PROCESS FOR THE PREPARATION OF AQUEOUS ANTIFOAM COMPOSITIONS

[75] Inventor: William J. Raleigh, Watervliet, N.Y.

[73] Assignee: General Electric Company, Waterford, N.Y.

[21] Appl. No.: 588,771

[22] Filed: June 20, 1975

[51] Int. Cl.$^2$ ............................................. B01D 19/04
[52] U.S. Cl. ................................. 252/358; 252/314; 252/321
[58] Field of Search ................................ 252/358, 321

[56] References Cited

U.S. PATENT DOCUMENTS

| | | | |
|---|---|---|---|
| 2,894,913 | 7/1959 | Sullivan et al. | 252/358 |
| 3,076,768 | 2/1963 | Boylan | 252/358 |
| 3,423,340 | 1/1969 | Marshall et al. | 252/358 |

*Primary Examiner*—Herbert B. Guynn
*Attorney, Agent, or Firm*—John L. Young; E. Philip Koltos; Edward A. Hedman

[57] ABSTRACT

There is provided a new improved two-part method of preparing an emulsified organosilicon-based, aqueous antifoam composition which comprises mixing thickened water (Part II) with a dispersion of an organosilicon antifoam agent and emulsifiers in water (Part I). The readily dilutable compositions provide economic advantages in manufacture, such as increased equipment utilization efficiency.

16 Claims, No Drawings

PROCESS FOR THE PREPARATION OF AQUEOUS ANTIFOAM COMPOSITIONS

The present invention relates to a process for making in two parts an aqueous emulsion of an antifoam agent, using thickened water and an aqueous dispersion of an antifoam agent having a relatively low amount of emulsifiers.

BACKGROUND OF THE INVENTION

Antifoaming compositions are materials used in the prevention, removal and control of unwanted foam. Foamed fluids are dispersions of air or other gas as the discontinuous phase in a continuous liquid phase. Usually, since air or gas makes up the larger volume portion of such a foam, the bubbles are separated only by a thin liquid film. Unwanted fluid foams are made up of numerous tiny bubbles of a mechanical or chemical origin which are generated within a liquid and which rise and accumulate at the liquid surface faster than they decay.

The fields in which unwanted foams are encountered are very diverse, with problems ranging from unesthetic foams which are hazardous. Foam problems are common in polymerization, paint processing and application, fermentation, sugar-refining, oil drilling and refining, food preparation, paper manufacture, sewage disposal, textile dyeing, adhesive application and conversion of ores refined by flotation. Liquid coolants, hydraulic fluids, lubricants, aviation fuels and gas adsorption fluids may foam with undesirable results under conditions of operation. If not properly controlled, foam can reduce equipment capacity and increase processing time and expense, as well as cause other disadvantages.

Although foam can be controlled by making basic changes in the process itself, or by using mechanical defoaming equipment, chemical antifoaming compositions have proven to be the most effective and economical. By adding the chemical antifoam compositions to the system, stabilized films are broken, causing the foam bubbles to decay, and thus substantially or completely defoaming the process.

Among the many chemical compositions which are known to be useful for the prevention and destruction of undesirable foams, some of the most effective and versatile antifoaming agents are silicone fluids. Silicone-based compounds or agents may be used as supplied, as suspensions in solvents or mixed with a portion of a dry ingredient from the foamer formulation.

Emulsions of silicone fluids are also available commercially for use as antifoaming agents. The features which make the use of emulsions desirable include nonflammability, compatibility with aqueous systems, ease of dilution, and effectiveness of these highly dispersed foams of silicones in applications where surface properties are important.

Silicone emulsions are generally made from standard fluids, emulsifying agents, water, and, if desired, finely divided solids (e.g., calcium carbonates, silica, etc.) which act as carriers for the silicone, increasing the exposed silicone interfacial area and, consequently, the effectiveness of the emulsion as an antifoaming agent. All classes of emulsifiers can be used: anionic, cationic, and nonionic. Normally, a water-in-oil dispersion is prepared by passing a mixture of silicone fluid, emulsifier, some water, and solid dispersant through a high shear blending device such as a colloid mill or homogenizer. The resulting paste is then dispersed in a larger amount of water with vigorous agitation. The final product is a silicone-in-water emulsion, wherein the silicone fluid may constitute up to 70% of the total emulsified composition. Most silicone emulsions, as sold, contain 10-70% silicone, but are usually diluted to much lower concentration before use. Commercial silicone emulsions are pourable systems of low to moderate viscosity, with good shelf stability and good resistance to phase separation.

The dimethyl silicones, in particular, are especially useful in antifoaming agents because of their low surface tension, inertness and insolubility in water. Moreover, they are useful at low concentrations against a wide range of foamers.

A recently developed class of improved antifoam agents comprises dimethylpolysiloxane compounds containing untreated and/or treated fumed silica (e.g., fumed silica treated with octacyclotetrasiloxane). The general process by which these antifoam agents are made requires that a mixture of the dimethylpolysiloxane fluid and the untreated and/or treated fumed silica filler is initially heated to about 150° C. in order to disperse the filler. The mixture is then homogenized under pressure or milled and cooled. The mixture is then reheated to about 150° C. for a considerable time to insure proper filler wet out. Finally, the mixture is again cooled and transferred to a storage container for subsequent use in antifoam compositions.

Typically, an aqueous silicone antifoam composition is prepared by making a mixture of water, silicone-based antifoam compound (e.g., mixtures of silicone fluid and particulate fillers such as silica), emulsifiers and other conventional additives in a premix vessel, milling the mixture until a homogeneous, non-settling dispersion is obtained, and transferring the homogeneous dispersion from the mill to a larger container, or dilution kettle, where more water is added to obtain the final emulsified antifoam composition.

A disadvantage of this method is that when antifoam composition of lesser silicone content are made using the same plant equipment as used with antifoam compositions of higher silicone content, the cycle time remains about the same for each product, although the lower silicone composition has a lower selling price and is thus less profitable.

There has now been discovered a new improved process for preparing emulsified aqueous antifoam compositions containing diorganopolysiloxane fluids and a silica filler. The present method involves a two-part operation in which thickened water, as one part, is combined with an aqueous dispersion of an organosilicon-based antifoam compound and an emulsifying agent, as a second part, to obtain an emulsified antifoam composition. A more efficient commercial operation is thus provided because two vessels (e.g., the premix kettle and the dilution kettle) can be utilized simultaneously in preparing each respective part of the composition, and the two parts can be combined to yield a stable final composition. By making more efficient use of plant equipment, the cycle time and production cost is thereby reduced as compared with prior art one-part methods.

Moreover, it has been unexpectedly discovered that in the present process, a relatively smaller amount of emulsifying agent is needed to obtain a final product of desired stability than with prior art methods.

DESCRIPTION OF THE INVENTION

In accordance with the present invention, emulsified antifoam compositions are prepared by a method which comprises:

i. dissolving an emulsifying agent in water;
ii. separately, dissolving a thickening agent in water;
iii. uniformly dispersing a diorganopolysiloxane antifoam agent in the mixture of step (i);
iv. milling the uniform dispersion of step (iii) until homogeneous and incapable of separating into two layers; and
v. adding the milled homogeneous dispersion of step (iv) to the thickened water of step (ii).

It can be seen that the present method involves the preparation of an aqueous emulsified antifoam composition in essentially two parts. One part comprises an aqueous solution of a thickening agent, i.e., thickened water, and the other part comprises a milled uniform dispersion of a diorganopolysiloxane antifoam agent and an emulsifying agent in water. The two parts are mixed together to obtain a stable aqueous emulsified composition.

An especially preferred method of practicing the present invention is as follows:

i. dissolving an emulsifying agent in water at a temperature in the range of from about 70° to about 80° C.;
ii. separately, dissolving a thickening agent in water at a temperature in the range of from about 70° to about 80° C.;
iii. uniformly dispersing a diorganopolysiloxane antifoam agent in the mixture of step (i) while maintaining the temperature of said mixture between about 70° and about 80° C.;
iv. cooling the uniform dispersion of step (iii) to a temperature below 60° C. and milling said dispersion until homogeneous and incapable of separation into two layers;
V. adding the milled homogeneous dispersion of step (iv) to the thickened water of step (ii), said thickened water being at a temperature in the range from about 35 to about 40° C.

With regard to the materials used in the present antifoam compositions the diorganopolysiloxane antifoam agent is a composition containing a diorganopolysiloxane fluid and a silica filler. Any of the well-known linear dimethylpolysiloxane fluids having a viscosity in the range of from about 100 to about 70,000 centistokes at 25° C. are suitable for the present purposes. For example, dimethylpolysiloxane fluids represented by the following general formula are suitable:

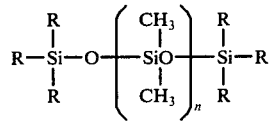

where R is the same or different and selected from monovalent hydrocarbon and substituted hydrocarbon radicals, such as aliphatic, haloaliphatic and cycloaliphatic, e.g., alkyl, alkenyl, cycloalkyl, haloalkyl, including methyl, ethyl, propyl, butyl, chlorobutyl, cyclohexyl, trifluoropropyl, aryl radicals, and halogenated aryl radicals, such as phenyl, chlorophenyl; alkenyl radicals such as xylyl, tolyl, and the like; aralkyl radicals, such as phenylethyl, benzyl, and the like; cycloalkyl, such as cyanoethyl; and n is sufficient to provide a viscosity of from about 100 to about 70,000 centistokes at 25° C. Preferably, all the R groups in the above formula are methyl, and it is also preferred that the viscosity of the dimethylpolysiloxanes used in the practice of this invention is from about 100 to about 30,000 centistokes at 25° C., and most preferably, from about 300 to about 1,000 centistokes at 25° C.

The silica filler can be any of the silicas conventionally employed with diorganopolysiloxane fluids in antifoam agents, such as untreated and/or treated fumed silica. The general process by which these compositions are made requires that a mixture of the dimethylpolysiloxane fluid and the untreated and/or treated fumed silica filler is intially heated to about 150° C. in order to disperse the filler. The mixture is then homogenized under pressure or milled and cooled. The mixture is then reheated to about 150° C. for considerable time to insure proper filler wet out. Finally, the mixture is again cooled and charged to a desired container for subsequent use.

Specifically, preferred silica fillers useful in the practice of the present invention are commercialy available from Cabot Corporation; SCM Glidden Durke Corp.; W.R. Grace Co.; Philadelphia Quartz; J.M. Huber Corp.; and the like.

The thickening agent can include any of the thickening compounds and mixtures thereof conventionally employed in aqueous systems. Especially preferred is carboxymethyl cellulose.

The emulsifying agent is a compound or compounds selected from among conventional emulsifiers, such as polyoxyethylene sorbitan monostearate (Tween 60), sorbitan monostearate (Span 60), polyoxyethylene stearate (Myrj 52), and mixtures thereof. Especially preferred are sorbitan monostearate (Span 60) and polyoxyethylene stearate (Myrj 52S). The emulsions are available from, e.g., Atlas Chemical (ICI of America) or from Mayer Chemical; Hodag Corp., and the like.

Of course, other additives which are generally used in antifoam compositions of the present type are also contemplated herein in minor but effective amounts, including bactericides. Sorbic acid is especially preferred as a bactericide, and is preferably added in the present method to the stable homogeneous antifoam composition obtained in step (v).

The amounts of the ingredients employed in the present process may vary within wide limits. Generally, however, the dimethylpolysiloxane-based antifoam agent comprises from about 5 to about 15% by weight of the total antifoam composition. The antifoam composition can be prepared in a concentrated form and diluted to the desired silicone solids content (e.g., 5 to 15% by weight) by addition of water to the stable emulsion obtained in step (v) of the present process. The dimethylpolysiloxane fluids of the antifoam agent comprises from about 80 to about 99% by weight of the antifoam agent while the silica filler comprises from about 20 to about 1% by weight, based on the amount of antifoam agent employed. A surprisingly small amount of emulsifying agent can be used to obtain a stable antifoam composition. This amount can vary, for instance, from about 0.5 to about 5% by weight of the total composition. The other ingredients, such as the thickening agent and the bactericide, are employed in minor but effective amounts. A preferred amount for both the thickeners and the bactericide is 0.05 to 3% by weight of each based on the total weight of the antifoam composition.

Included among the advantages of the present antifoam compositions is their ability to defoam and prevent foam even when employed at low concentrations. For instance, concentrations of from about 10 to about 1,000 parts per million are suitable. Of course, these concentrations are dependent upon several factors including the system desired to be defoamed and the particular desires of the user.

The following examples are illustrative of how the present invention may be practiced as compared with conventional means. They are not intended, however, to limit the invention to the embodiments disclosed therein.

EXAMPLE 1

This example illustrates a conventional preparation of an aqueous emulsified organosilicon-based antifoam composition. All parts are by weight.

Into a premix kettle, the following ingredients are charged: 27.5 parts of water; 6.6 parts of emulsifier (Span 60); 4.6 parts of emulsifier (Myrj 52S) and 11.5 parts of a polyorganosiloxane antifoam agent which consists of dimethylpolysiloxane of 350 cks. viscosity and silica filler. The water is added first and maintained at a temperature of from about 70° to 80° C. The emulsifiers are added to the heated water and the mixture is agitated for about 30 minutes. The antifoam agent is then added slowly with moderate agitation while keeping the temperature of the premix above 70° C. Mixing is continued for 15 to 30 minutes to obtain the premix.

To the premix is added 0.2 parts of sorbic acid and 49.6 parts of water which is heated to about 70° to 80° C.

The premix composition is milled on a colloid mill into a dilution kettle containing heated water. The blend is agitated for about 30 minutes and the resulting emulsion is changed to a larger third vessel, or holding tank, to which are added further batches. The final product is filtered and transferred into drums for shipping and storage.

Thus, a stable antifoam emulsion is prepared which has the composition shown in Table 1.

Table 1

| Material | Weight % |
| --- | --- |
| Water | 77.1 |
| Span 60 | 6.6 |
| Myrj 52S | 4.6 |
| Antifoam Compound* | 11.5 |
| Sorbic acid | 0.2 |

*(dimethylpolysiloxane fluid, 350 cks. viscosity (GE-SF-96) silicate filler and oleic acid; AF-70).

It should be noted that this product requires a relatively high level of emulsifying agent, i.e., 11.2%.

EXAMPLE 2

An aqueous emulsified antifoam composition is prepared according to the present invention, using the same equipment as in Example 1. All parts are by weight.

The premix is prepared as in Example 1, except that the following amounts are used: 8.8 parts of water; 1.1 parts of emulsifier (Span 60); 0.9 parts of emulsifier (Myrj 52S) and 10.0 parts of The organopolysiloxane of antifoam agent of Example 1.

Into a separate container, or dilution vessel, 48.2 parts of water are charged. The water is maintained at a temperature of from about 70° to about 80° C. To this is added 0.8 parts of thickener (carboxymethyl cellulose, CMC7H) and the mixture is agitated rapidly until the thickener is dissolved (about 1 hour). The thickened water is then cooled to about 35+ to 40° C. One-half of the thickened water in the dilution kettle is transferred to the holding tank.

The premix is cooled to about 55° to 60° C. and milled on a colloid mill at about 4 to 6 mils into the dilution kettle containing the remaining one-half of the thickened water. The blend is agitated for about 30 minutes and transferred to the holding tank where 30 parts of water are added and mixed. The sorbic acid bactericide (0.2 parts) is then added and the composition is agitated for about 1 hour or until uniform, and filtered and placed into drums.

This procedure yields a stable antifoam emulsion of the composition of Table 2.

Table 2

| Material | Weight % |
| --- | --- |
| Water | 87 |
| Span 60 | 1.1 |
| Myrj 52S | 0.9 |
| Antifoam Compound AF-70* | 10.0 |
| Thickener (CMC) | 0.8 |
| Sorbic acid | 0.2 |

*See Example 1.

Notably, the composition made according to the present invention (Example 2) requires much less emulsifying agent (2% total) to obtain a stable non-settling emulsion than the composition of Example 1 (11.2% total).

The composition of Table 2 exhibits the properties shown in Tables 3 and 4.

Table 3

| Laboratory Test Properties | |
| --- | --- |
| Property | Value |
| Viscosity (cps. at 25° C.) | 1050 |
| Percent solids | 12.6 |
| Defoam (mg./ml.) | 0.19 |
| Centifuge stability | T-0.5 cc. cream |
| | B-0.5 cc. cream |

Table 4

| Pilot Plant Test Properties | |
| --- | --- |
| Property | Value |
| Viscosity | 1300 |
| Percent solids | 12.0 |
| Defoam (mg./ml.) | 0.23 |
| Centifuge stability | T-trace cream |
| | B-0.5 cc. sediment |

The defoam test procedure used above is as follows:

Equipment. A 2 beater kitchen-mixer, 1500 ml.* beaker; 4 dram vial with dropper, analytical balance, 50 ml. burette graduated to 0.1 ml., 0.5% solution of sodium lauryl sulfate.

*If necessary, a ½ gal. ice cream container may be substituted for the 1500 ml. beaker.

Note. The timing sequence for the successive additions of reagent and sample which are described in the procedure are to be duplicated as closely as possible. The elapsed time between successive addition of sodium lauryl-sulfate solution is to be no greater than 30 seconds.

Use in this sequence toluene, acetone and distilled water to rinse the beaker and beaters between tests.

A test temperature of 25° C. is recommended. Record the actual test temperature.

Procedure.

1. To a 1500 ml.* beaker which has been arranged for mixing with a mixer add 200 ml. of distilled water. The mixer is to be equipped with two beaters only. Set the mixer at maximum speed.

*If necessary, a ½ gal. ice cream container may be substituted for the 1500 ml. beaker.

2. Add at maximum ratte 0.5% sodium lauryl sulfate solution until a foam height which just covers the beaters is formed. (Always refill burette before making additions.)

3. Immediately add enough sample to collapse the foam (usually 1 to 2 drops when pre-conditioning).

4. After the foam level has subsided again add at maximum rate the 0.5% sodium lauryl sulfate as described in Step 2.

5. Add 2 drops of sample.

6. After the foam level has subsided, shut the mixer off. The time interval between the following two steps should be no longer than 10 minutes.

7. Weigh a weighing bottle containing approximately 10 gms. of sample and a medicine dropper to ± 0.001 gms. Record the weight as $W_1$.

8. Turn the mixer to maximum speed. Record the volume of sodium lauryl sulfate reagent in the burette. Repeat Step 2 (each time noting the volume of reagent used) and Step 3 until five successive additions of reagent and sample have been made.

9. Weigh the weighing bottle with sample and dropper. Record the weight as $W_2$.

10. Total the volume of each of the five additions of sodium lauryl sulfate added in Step 8. Record the volume as $V_T$. Divide by 5 to obtain the average volume, $V_A$. Divide the average by 4. Add and substract this result to $V_A$ to give the range $V_L$-$V_U$. Compare each of the five individual volumes to this range. They must fall within the range or else the test is to be repeated.

11. Calculate the ratio, R, of the total weight in mgm. of sample used to the total volume in ml. of sodium lauryl sulfate used.

$$R = \frac{W_1 - W_2}{V_T}$$

12. Convert milligrams of sample/ml. of sodium lauryl sulfate solution to mg. silicone/ml. as follows:

mg. silicone/ml. = R/f

Thus, it is seen that a superior antifoam is produced by an efficient process.

Obviously, many variations will suggest themselves to those of skill in the art in view of the above detailed disclosure. All such obvious variations are within the full intended scope of the appended claims.

I claim:

1. A method of preparing an emulsified antifoam composition, which comprises:
   i. dissolving an emulsifying agent selected from the group consisting of polyoxyethylene sorbitan monostearate, sorbitan monostearate, polyoxyethylene stearate, and mixtures thereof in water;
   ii. separately, dissolving a thickening agent in water;
   iii. uniformly dispersing a diorganopolysiloxane antifoam agent in the mixture of step (i);
   iv. milling the uniform dispersion of step (iii) until homogeneous and incapable of separating into two layers; and
   v. mixing the milled homogeneous dispersion of step (iv) with the thickened water produced in step (ii).

2. A method as defined in claim 1 which further comprises diluting the milled homogeneous dispersion with water.

3. A method as defined in claim 1 which further comprises adding a bactericide to the milled homogeneous dispersion.

4. A method as defined in claim 3 wherein the bactericide is sorbic acid.

5. A method as defined in claim 1 wherein the emulsifying agent consists of a mixture of sorbitan monostearate and polyoxyethylene stearate.

6. A method as defined in claim 1 wherein the thickening agent consists of carboxymethyl cellulose.

7. A method as defined in claim 1 wherein the diorganopolysiloxane antifoam agent consists of dimethylpolysiloxane fluid and a silica filler.

8. A method as defined in claim 7 wherein the dimethylpolysiloxane has the general formula:

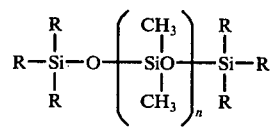

wherein R is the same or different and is selected from the group consisting of alkyl radicals, haloalkyl radicals, cycloalkyl radicals, cyanoalkyl radicals, aryl radicals, alkaryl radicals, haloaryl radicals and aralkyl radicals and n is a number sufficient to provide a viscosity from about 100 to about 70,000 centistokes at 25° C.

9. A method of making an emulsified antifoam composition, which comprises:
   i. dissolving an emulsifying agent selected from the group consisting of polyoxyethylene sorbitan monostearate, sorbitan monostearate, polyoxyethylene stearate, and mixtures thereof in water at a temperature in the range of from about 70° to about 80° C.;
   ii. separately, dissolving a thickening agent in water at a temperature in the range of from about 70° to 80° C.;
   iii. uniformly dispersing a diorganopolysiloxane antifoam agent in the mixture of step (i) while maintaining the temperature of said mixture between about 70° and about 80° C.;
   iv. cooling the uniform dispersion of step (iii) to a temperature below 60° C. and milling said dispersion until homogeneous and incapable of separation into two layers;
   v. adding the milled homogeneous dispersion of step (iv) to the thickened water of step (ii), said thickened water being at a temperature in the range from about 35° to about 40° C.

10. A method as defined in claim 9 wherein the thickening agent consists of carboxymethyl cellulose.

11. A method as defined in claim 9 wherein the emulsifying agent consists of a mixture of sorbitan monostearate and polyoxyethylene stearate.

12. A method as defined in claim 9 wherein the antifoam agent consists of dimethylpolysiloxane fluid and a silica filler.

13. A method as defined in claim 12 wherein said dimethylpolysiloxane fluid has a viscosity in the range of from about 100 to about 70,000 centistokes at 25° C.

14. A method of making an emulsified antifoam composition, which comprises:

i. dissolving from about 0.5 to about 5% by weight of an emulsifying agent in water at a temperature in the range of from about 70° to about 80° C., said emulsifying agent consisting of a mixture of sorbitan monostearate and polyoxyethylene stearate;

ii. separately, dissolving from about 0.05 to about 3% by weight of a thickening agent in water at a temperature in the range of from about 70° to 80° C., said thickening agent consisting of carboxymethyl cellulose;

iii. uniformly dispersing from about 5 to about 15% of a diorganopolysiloxane antifoam agent in the mixture of step (i) while maintaining the temperature of said mixture between about 70° and about 80° C.;

iv. cooling the uniform dispersion of step (iii) to a temperature below 60° C. and milling said dispersion until homogeneous and incapable of separation into two layers; and v. adding the milled homogeneous dispersion of step (iv) to the thickened water of step (ii), said thickened water being at a temperature in the range from about 35° to about 40° C.

15. A method as defined in claim 14 wherein the antifoam agent consists of a dimethylpolysiloxane fluid and a silica filler.

16. A method as defined in claim 15 wherein said dimethylpolysiloxane fluid has a viscosity in the range of from about 100 to about 70,000 centistokes at 25° C.

* * * * *